A. W. OLDS.
Rotary Harrow.
No. { 2,208, 33,212. }
Patented Sept. 3, 1861.
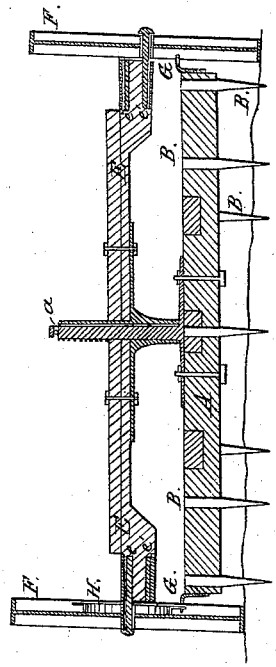
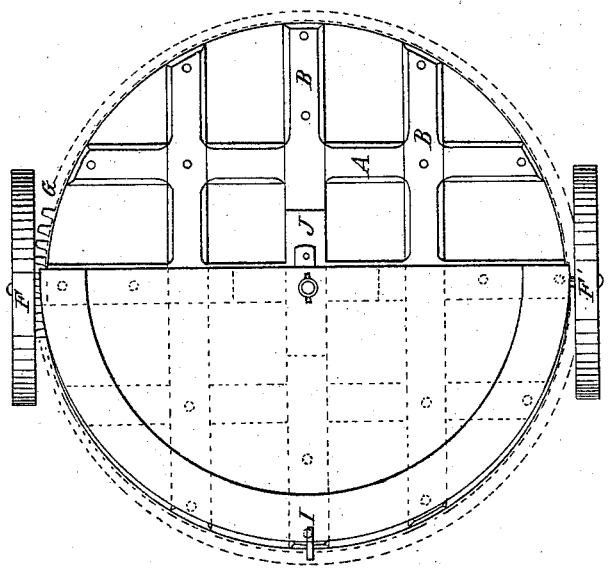
Witnesses:
J. Brainerd
E. F. Olds
Inventor:
A. W. Olds

UNITED STATES PATENT OFFICE.

ALONZO W. OLDS, OF GREEN OAK, MICHIGAN.

IMPROVEMENT IN ROTARY HARROWS.

Specification forming part of Letters Patent No. 33,212, dated September 3, 1861.

*To all whom it may concern:*

Be it known that I, ALONZO W. OLDS, of Green Oak, in the county of Livingston and State of Michigan, have invented new and useful Improvements in Rotary Harrows; and I do hereby declare that the following is a full and complete description of the construction and operation of the same, reference being had to the accompanying drawings, making part of this specification, in which—

Figure 1 is a top view, and Fig. 2 is a transverse vertical section.

Like letters refer to like parts.

In Figs. 1 and 2, A represents the harrow-frame. This may be constructed in any of the usual forms by cross-timbers or by radial arms.

The teeth of the harrow are represented by B. These may pass through the timbers at right angles, or be inclined.

C is a standard or stem rising at right angles or perpendicular to the frame of the harrow, and to which it is securely bolted. This stem C is round and slightly tapering, and has a hole, $a$, through the top for the insertion of a pin or key.

D is a pipe-box, which passes over the stem C, and to which the axle-tree E is secured.

F F' are bearing-wheels, which support the weight of the harrow, and which, by their vertical adjustment, as shown at $e\ e'$, Fig. 2, regulate the depth to which the harrow-teeth penetrate the ground.

G represents a cog-wheel placed around the extremity of the timbers or arms composing the harrow-frame.

H is another cog-wheel, having the same pitch of teeth as the cog-wheel G, into which it gears. The wheel H, being attached to the bearing-wheel F, must of necessity revolve with it, and when the wheels F and F' are adjusted, as seen in Fig. 2, the harrow being drawn in the direction of the arrow in Fig. 1, a relatively backward motion is imparted to that side of the harrow-frame to which the bearing-wheel F and cog-wheel H are attached. When the axle of the wheel F is adjusted to the socket $e$, and the axle of the wheel F' is adjusted to the socket $e'$, the teeth upon the side of the wheel F' are not suffered to penetrate the earth as deeply as those upon the opposite side, and which will either cause or aid in rotating the harrow.

I is the draw-bar. This is attached to the pipe D or axle-tree E. A semicircular platform may be placed above it, with a seat for the driver, whose weight will not affect the depth the teeth penetrate the ground, for this weight, together with the weight of the harrow, is supported by the wheels F F'.

The harrow can be caused to rotate in the opposite direction by interchanging the position of the wheels F F'.

The adjustment of the wheels F F' may be by means of two or more sockets, $e\ e'$, or in any other manner essentially the same.

What I claim as my improvement, and desire to secure by Letters Patent, is—

The interchangeable adjustment of the wheels F F' in the sockets $e\ e'$, operating in the manner and for the purpose set forth.

A. W. OLDS.

Witnesses:
 J. BRAINERD,
 E. F. OLDS.